United States Patent
Huang

(10) Patent No.: US 11,010,869 B2
(45) Date of Patent: May 18, 2021

(54) IMAGE PROCESSING CIRCUIT AND ASSOCIATED IMAGE PROCESSING METHOD

(71) Applicant: Realtek Semiconductor Corp., HsinChu (TW)

(72) Inventor: Yu-Shiang Huang, New Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 84 days.

(21) Appl. No.: 16/528,585

(22) Filed: Jul. 31, 2019

(65) Prior Publication Data

US 2020/0143512 A1 May 7, 2020

(30) Foreign Application Priority Data

Nov. 2, 2018 (TW) ................................ 10713889.6

(51) Int. Cl.
*G06T 3/40* (2006.01)
*G06T 7/10* (2017.01)

(52) U.S. Cl.
CPC .............. *G06T 3/4007* (2013.01); *G06T 7/10* (2017.01)

(58) Field of Classification Search
CPC ....................... G06T 3/4007–4092; G06T 7/10
See application file for complete search history.

(56) References Cited

U.S. PATENT DOCUMENTS

| 8,537,179 | B2 * | 9/2013 | Moriya | H04N 1/409 345/660 |
| 2010/0134518 | A1 * | 6/2010 | Moriya | H04N 1/4092 345/660 |
| 2013/0016920 | A1 * | 1/2013 | Matsuda | G06T 3/4053 382/299 |
| 2020/0143512 | A1 * | 5/2020 | Huang | G06T 7/10 |

FOREIGN PATENT DOCUMENTS

JP            11261849 A  *  9/1999

* cited by examiner

*Primary Examiner* — Sean T Motsinger
(74) *Attorney, Agent, or Firm* — Winston Hsu

(57) ABSTRACT

The present invention provides an image processing circuit, wherein the image processing circuit comprises a receiving circuit, an image dividing circuit, a first image enlargement circuit, a second image enlargement circuit and an output circuit. In the operations of the image processing circuit, the receiving circuit receives image data, the image dividing circuit divides a pixel value of each pixel of the image data into two parts to generate first image data and second image data, the first image enlargement circuit enlarges the first image data in a linear manner to generate enlarged first image data, the second image enlargement circuit enlarges the second image data in a non-linear manner to generate enlarged second image data, and the output circuit generates an output image according to the enlarged first image data and the enlarged second image data.

16 Claims, 3 Drawing Sheets

IMAGE PROCESSING CIRCUIT AND ASSOCIATED IMAGE PROCESSING METHOD

BACKGROUND OF THE INVENTION

1. Field of the Invention

The present invention relates to image processing, and more particularly, to an image enlargement techniques.

2. Description of the Prior Art

In a conventional image enlargement technique, a spline method is used to calculate pixel values of the enlarged image. However, this method causes an irregular shape of the oblique edges in the image, and if other image enlargement techniques are to be used to alleviate this phenomenon, a large amount of computation is usually required to increase the software operation time or the hardware manufacturing cost. In addition, when the enlargement factor (i.e. enlargement ratio) is large, the enlarged image has a fuzzy edge transition at the edge, so that a large amount of calculation is required to improve this issue.

SUMMARY OF THE INVENTION

It is therefore an objective of the present invention to provide an image processing circuit, which can use a lower amount of computation to generate the enlarged image with higher sharpness, to solve the above-mentioned problems.

In one embodiment of the present invention, an image processing circuit is disclosed, wherein the image processing circuit comprises a receiving circuit, an image dividing circuit, a first image enlargement circuit, a second image enlargement circuit and an output circuit. In the operations of the image processing circuit, the receiving circuit receives image data, the image dividing circuit divides a pixel value of each pixel of the image data into two parts to generate first image data and second image data, the first image enlargement circuit enlarges the first image data in a linear manner to generate enlarged first image data, the second image enlargement circuit enlarges the second image data in a non-linear manner to generate enlarged second image data, and the output circuit generates an output image according to the enlarged first image data and the enlarged second image data.

In another embodiment of the present invention, an image processing method comprises the steps of: receiving image data; dividing a pixel value of each pixel of the image data into two parts to generate first image data and second image data; enlarging the first image data in a linear manner to generate enlarged first image data; enlarging the second image data in a non-linear manner to generate enlarged second image data; and generating an output image according to the enlarged first image data and the enlarged second image data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
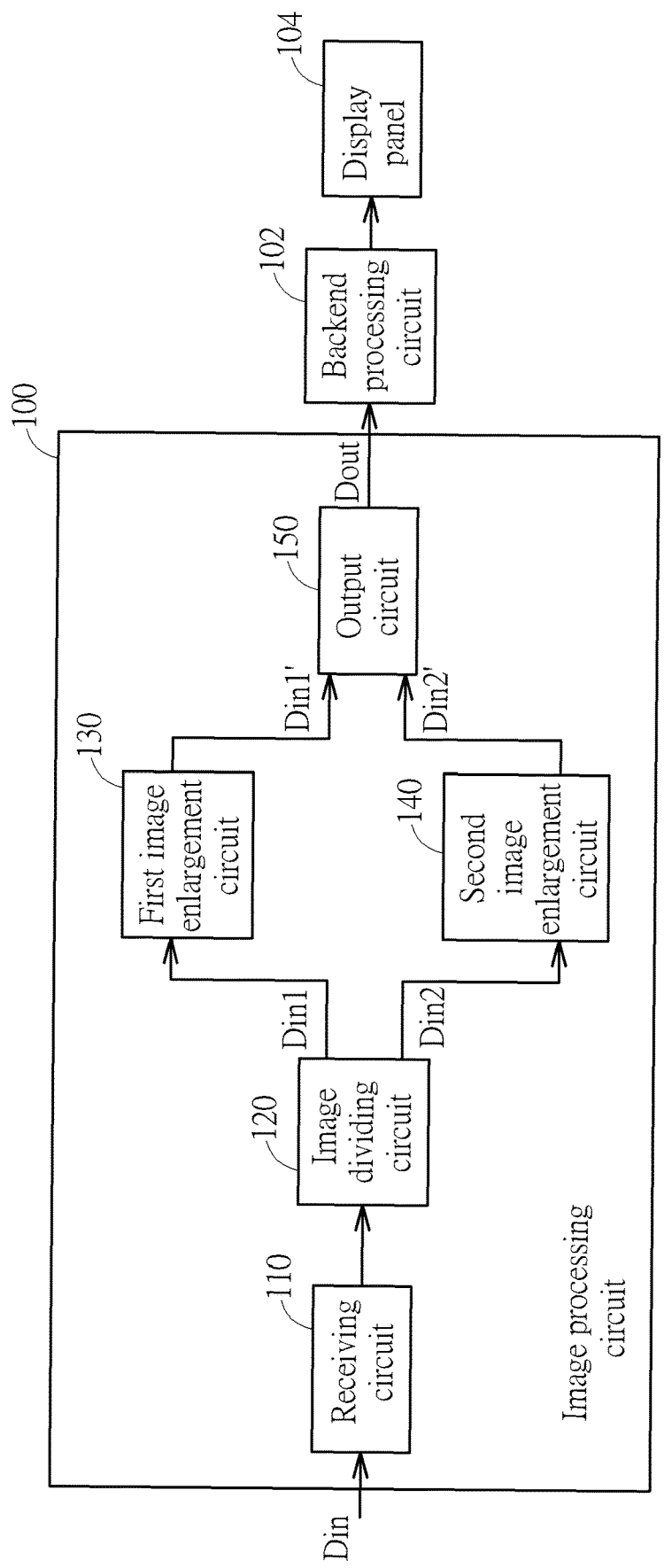
FIG. 1 is a diagram illustrating an image processing circuit according to one embodiment of the present invention.

FIG. 1 is a diagram illustrating an image processing circuit 100 according to one embodiment of the present invention. As shown in FIG. 1, the image processing circuit 100 comprises a receiving circuit 110, an image dividing circuit 120, a first image enlargement circuit 130, a second image enlargement circuit 140 and an output circuit 150. In this embodiment, the image processing circuit 100 is used to receive image data (e.g. image frame) Din and perform the enlargement operations upon the image data Din to generate an output image Dout, and the output image Dout is processed by a backend processing circuit 102 and then transmitted to a display panel 104 to be displayed thereon.

In the operations of the image processing circuit 100, the receiving circuit 110 receives the image data Din, and the image dividing circuit 120 divides a pixel value of each pixel of the image data Din into two parts to generate first image data Din1 and second image data Dint. Then, the first image enlargement circuit 130 enlarges the first image data Din1 in a linear manner to generate enlarged first image data Din1', and the second image enlargement circuit 140 enlarges the second image data Dint in a non-linear manner to generate enlarged second image data Din2'. Then, the output circuit 150 generates the output image Dout according to the enlarged first image data Din1' and the enlarged second image data Din2'.

In the following descriptions, it is assumed that the image data Din comprises consecutive N pixels in the same column or the same row of a frame. For convenience of explanation, the following contents are described by using four consecutive pixels. Assuming that the pixels corresponding to positions 0, 1, 2 and 3 of the image data Din have the pixel values "0", "3", "7" and "8", respectively, and because the pixel values "0", "3", "7" and "8" are strict increasing sequence, the image dividing circuit 120 can calculate the pixel value difference of each pair of adjacent pixels of the four pixels to obtain three pixel value differences, and refer a minimum one of the three pixel value differences (the minimum pixel value difference can also be called as common brightness difference) to determine four first pixel values of the first image data Din1 and four second pixel values of the second image data Dint. Specifically, refer to table 1 as follows:

TABLE 1

| Position | 0 | 1 | 2 | 3 |
|---|---|---|---|---|
| Original pixel value | 0 | 3 | 7 | 8 |
| Pixel value difference |  | 3 | 4 | 1 |
| Minimum pixel value difference |  | 1 | 1 | 1 |
| First pixel value | 0 | 1 | 2 | 3 |
| Second pixel value | 0 | 2 | 5 | 5 |

In the Table 1, because the minimum pixel value difference is equal to "1", the image dividing circuit 120 uses the minimum pixel value difference to calculate an equally spaced sequence 0, 1, 2, 3 as the first pixel values in the first image data Din1, and these first pixel values are determined to be suitable for using the linear interpolation to enlarge the image. In addition, the image dividing circuit 120 subtracts the first pixel values 0, 1, 2 and 3 from the four original pixel values 0, 3, 7 and 8 to obtain four second pixel values 0, 2, 5 and 5, and the second pixel values are determined to be unsuitable for using the linear interpolation to enlarge the image.

In the operations of the first image enlargement circuit 130, the first pixel values 0, 1, 2, and 3 are linearly interpolated to generate (3*M+1) pixel values of the enlarged first image data Din1', where M is an enlargement factor. In Table 2 shown below, the enlargement factor is "10" as an explanation.

Figure 2:
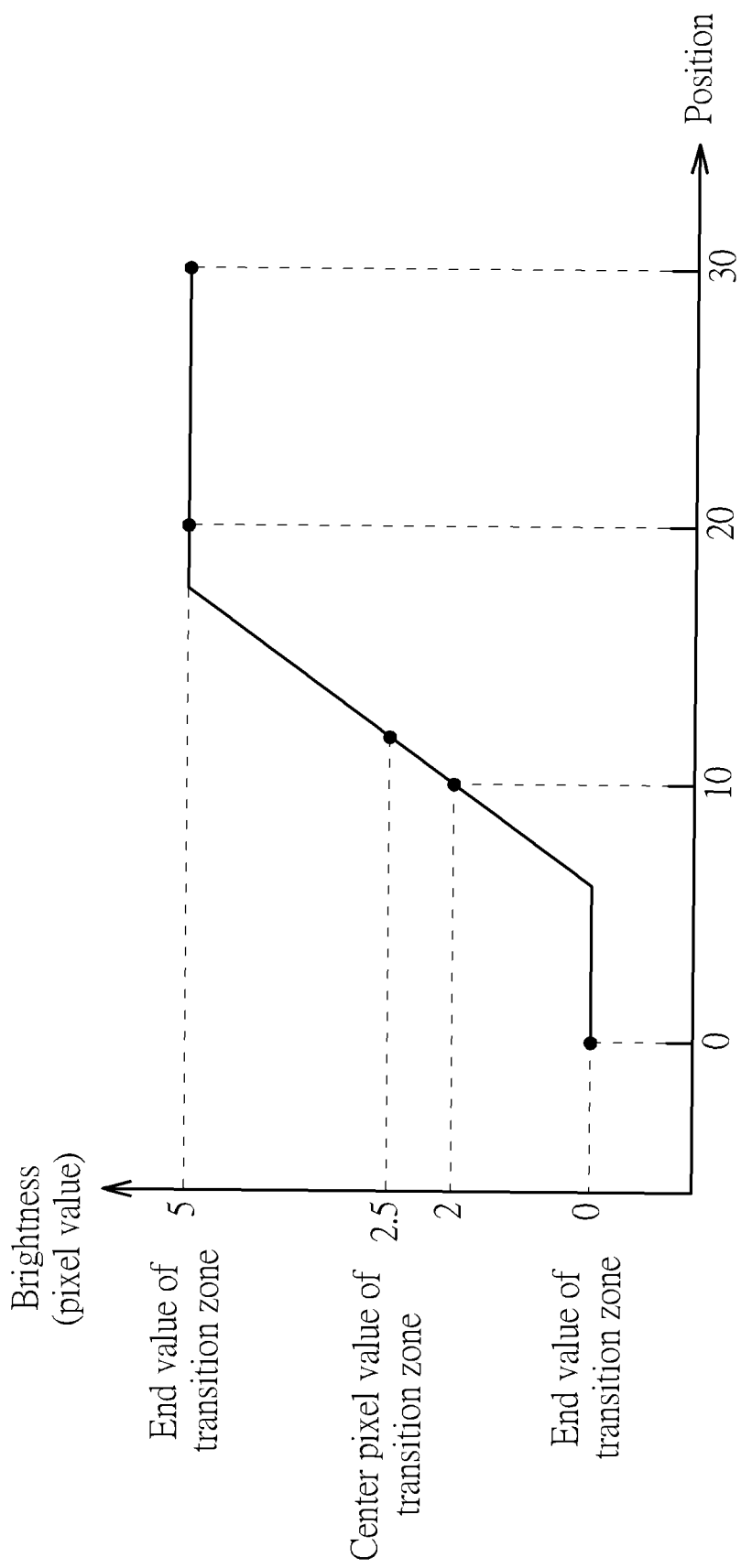
FIG. 2 shows the operations of the second image enlargement circuit according to one embodiment of the present invention.

In the operations of the second enlargement circuit 140, referring to FIG. 2, the second image enlargement circuit 140 first calculates a center pixel value of a transition zone of the four second pixel values 0, 2, 5 and 5. In this embodiment, the four second pixel values 0, 2, 5 and 5 themselves can be regarded as the transition zone, and the pixel values 0 and 5 are respectively used as two end values of the transition zone, and the second enlargement circuit 140 can calculate an average of the end values of the transition zone (i.e., 0 and 5) to obtain the center pixel value "2.5" of the transition zone. Then, the second image enlargement circuit 140 calculates (3*M+1) pixel values in the enlarged second image data Dint' according to a set slope, wherein as shown in FIG. 2, the (3*M+1) pixel values of the enlarged second image data Dint' contain three segments, wherein each pixel value of the leftmost first segment is equal to the end value "0" of the transition zone. The plurality of pixel values of the second segment are generated by using the two end values of the transition zone to perform the interpolation calculation, and the plurality of pixel values of the second segment pass at least the center pixel value of the transition zone, and in a preferred embodiment, the plurality of pixel values of the second segment also include one of the second pixel values (i.e. the second pixel value "2"). Each pixel value of the rightmost third segment is equal to the end value "5" of the transition zone.

Finally, the output circuit 150 directly combines the (3*M+1) pixel values of the enlarged first image data Din1' with the (3*M+1) pixel values of the enlarged second image data Dint' to generate (3*M+1) pixel values of the output image Dout.

The Table 2 shows an example of the thirty-one (i.e. 3*10+1) pixel values in the enlarged first image data Din1' (assuming that the enlargement factor is "10"), thirty-one pixel values in the enlarged second image data Din2', and thirty-one pixel values in the output image Dout.

TABLE 2

| Position | 0 | 1 | 2 | 3 | 4 | 5 | 6 | 7 | 8 | 9 | 10 |
|---|---|---|---|---|---|---|---|---|---|---|---|
| Enlarged first image data Din1' | 0 | 0.1 | 0.2 | 0.3 | 0.4 | 0.5 | 0.6 | 0.7 | 0.8 | 0.9 | 1 |
| Enlarged second image data Din2' | 0 | 0 | 0 | 0 | 0 | 0 | 0 | 0.5 | 1 | 1.5 | 2 |
| Output image | 0 | 0.1 | 0.2 | 0.3 | 0.4 | 0.5 | 0.6 | 1.2 | 1.8 | 2.4 | 3 |
| Position | 10 | 11 | 12 | 13 | 14 | 15 | 16 | 17 | 18 | 19 | 20 |
| Enlarged first image data Din1' | 1 | 1.1 | 1.2 | 1.3 | 1.4 | 1.5 | 1.6 | 1.7 | 1.8 | 1.9 | 2 |
| Enlarged second image data Din2' | 2 | 2.5 | 3 | 3.5 | 4 | 4.5 | 5 | 5 | 5 | 5 | 5 |
| Output image | 3 | 3.6 | 4.2 | 4.8 | 5.6 | 6 | 6.6 | 6.7 | 6.8 | 6.9 | 7 |
| Position | 20 | 21 | 22 | 23 | 24 | 25 | 26 | 27 | 28 | 29 | 30 |
| Enlarged first image data Din1' | 2 | 2.1 | 2.2 | 2.3 | 2.4 | 2.5 | 2.6 | 2.7 | 2.8 | 2.9 | 3 |
| Enlarged second image data Din2' | 5 | 5 | 5 | 5 | 5 | 5 | 5 | 5 | 5 | 5 | 5 |
| Output image | 7 | 7.1 | 7.2 | 7.3 | 7.4 | 7.5 | 7.6 | 7.7 | 7.8 | 7.9 | 8 |

The above embodiment is an enlargement operation of a plurality of pixels having a single direction (for example, a lateral enlargement operation of the image data Din), and then the image dividing circuit 120, the first image enlargement circuit 130, and the second image enlargement circuit 140 perform the enlargement operations upon the pixels in the other direction (for example, the longitudinal direction of the image data Din), to complete the enlargement of the entire image data Din to generate the output image Dout. Since the pixels at the edge of the image generally have strict increasing/decreasing pixel values, the operations of the above embodiment can surely and effectively reduce the edge blur caused by the enlargement operations. In addition, because the calculation steps are relatively simple, only simple software operations or hardware calculation circuits are required to reduce the design and manufacturing costs.

In an embodiment, if the pixel values corresponding to the positions 0, 1, 2 and 3 of the image data Din are not increasing/decreasing sequence or a strict increasing/decreasing sequence, for example, 2, 1, 4 and 3, the image dividing circuit 120 can divide the pixel values 2, 1, 4, 3 to obtain the first pixel value "2, 1, 1, 0" and the second pixel value "0, 0, 3, 3", to perform the linear interpolation operation and nonlinear interpolation operation respectively, and then add together to obtain the output image.

It should be noted that the enlargement operations of the pixel values in the above embodiment may include a plurality of pixel values of different colors according to different color models. Taking the "red, green and blue" color model as an example, the enlargement operations of the plurality of pixels includes the enlargement operations of red pixel values, green pixel values, and blue pixel values. Taking the "luminance and color difference (YUV)" color model as an example, the enlargement operations of the plurality of pixels includes the enlargement operations brightness, blue chroma components, and red chroma components. Taking the "cyan, magenta, yellow, black (CMYK)" color model as an example, the enlargement operations of the plurality of pixels includes cyan pixel values, magenta pixel values, yellow pixel values and black pixel values.

Figure 3:
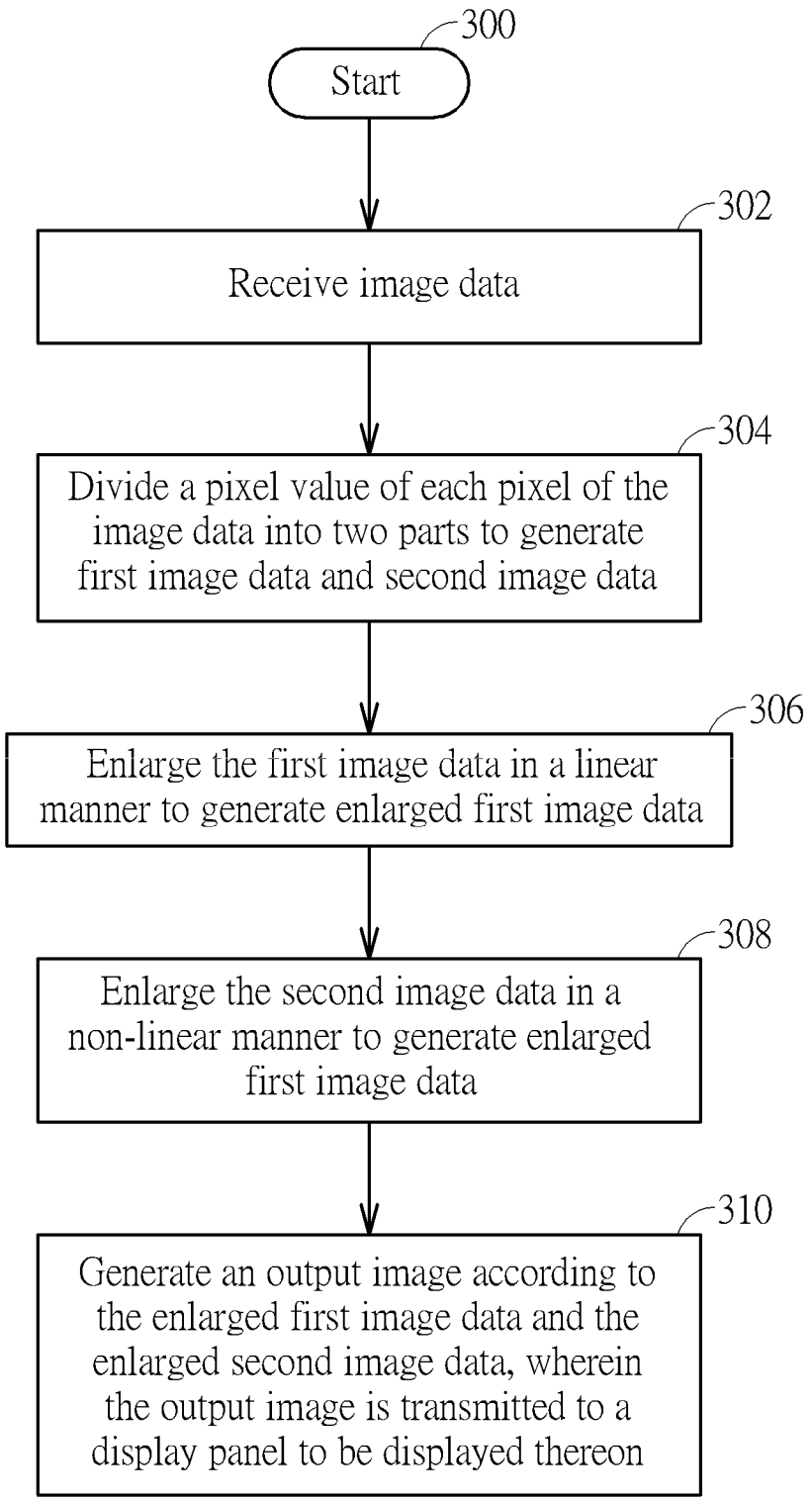
FIG. 3 is a flowchart of an image processing method according to one embodiment of the present invention.

FIG. 3 is a flowchart of an image processing method according to one embodiment of the present invention. Refer to the above disclosure, the flow of the image processing method is described as follows.

Step 300: the flow starts.
Step 302: receive image data.
Step 304: divide a pixel value of each pixel of the image data into two parts to generate first image data and second image data.
Step 306: enlarge the first image data in a linear manner to generate enlarged first image data.
Step 308: enlarge the second image data in a non-linear manner to generate enlarged first image data.
Step 310: generate an output image according to the enlarged first image data and the enlarged second image data, wherein the output image is transmitted to a display panel to be displayed thereon.

Briefly summarized, in the image processing circuit of the present invention, firstly, the image data is divided into the first image data and the second image data, then the first image data and the second image data are processed by the linear interpolation operations and the non-linear interpolation operations, respectively, to generate the enlarged first image data and the enlarged second image data, then the enlarged first image data and the enlarged second image data are combined to generate the output image. By using the image processing circuit of the present invention, the edge blur caused by the enlargement operations can be effectively reduced without increasing too much design and manufacturing costs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit, comprising:
   a receiving circuit, arranged to receive image data;
   an image dividing circuit, arranged to divide a pixel value of each pixel of the image data into two parts to generate first image data and second image data;
   a first image enlargement circuit, arranged to enlarge the first image data in a linear manner to generate enlarged first image data;
   a second image enlargement circuit, arranged to enlarge the second image data in a non-linear manner to generate enlarged second image data; and
   an output circuit, arranged to generate an output image according to the enlarged first image data and the enlarged second image data;
   wherein for consecutive N pixels of the image data, the image dividing circuit divides original pixel values of the N pixels into two parts according to pixel value differences of each pair of adjacent pixels of the N pixels, to generate N first pixel values of the first image data and N second pixel values of the second image data.

2. The image processing circuit of claim 1, wherein when the N original pixel values of the N pixels are strict increasing sequence, the image dividing circuit calculates the pixel value differences of each pair of adjacent pixels of the N pixels to generate (N−1) pixel value differences, and selects a minimum pixel value difference from the (N−1) pixel value differences to generate the N first pixel values, wherein each of pixel value differences of each pair of adjacent pixels of the N first pixel values is equal to the minimum pixel value difference.

3. The image processing circuit of claim 2, wherein the image dividing circuit subtracts the N first pixel values from the N original pixel values to generate the N second pixel values.

4. The image processing circuit of claim 1, wherein the second image enlargement circuit determines a first end value and a second end value of a transition zone according to the N second pixel values, and calculates a center pixel value of the transition zone; and the second image enlargement circuit refers to the first end value, the second end value and the center pixel value of the transition zone to enlarge the N second pixel values in the non-linear manner to generate (N−1)*M+1 pixel values of the enlarged second image data, wherein M is an enlargement factor.

5. The image processing circuit of claim 4, wherein the (N−1)*M+1 pixel values comprises three segments, each of the pixel values of a first segment is equal to the first end value of the transition zone, the pixel values of a second segment are calculated by using interpolations according to the first end value and the second end value of the transition zone, and each of the pixel values of a third segment is equal to the second end value of the transition zone.

6. The image processing circuit of claim 5, wherein the pixel values of the second segment are calculated by using linear interpolations according to the first end value and the second end value of the transition zone.

7. The image processing circuit of claim 6, wherein the pixel values of the second segment comprise the center pixel value of the transition zone, and the center pixel value of the transition zone is an average of the first end value and the second end value of the transition zone.

8. The image processing circuit of claim 4, wherein the first image enlargement circuit performs a linear interpolation operation upon the N first pixel values to generate (N−1)*M+1 pixel values of the enlarged first image data, and the output circuit directly adds the (N−1)*M+1 pixel values of the enlarged first image data and the (N−1)*M+1 pixel values of the enlarged second image data to generate the output image.

9. An image processing method, comprising:
   receiving image data;
   dividing a pixel value of each pixel of the image data into two parts to generate first image data and second image data;
   enlarging the first image data in a linear manner to generate enlarged first image data;
   enlarging the second image data in a non-linear manner to generate enlarged second image data; and
   generating an output image according to the enlarged first image data and the enlarged second image data;
   wherein the step of dividing the pixel value of each pixel of the image data into two parts to generate the first image data and the second image data comprises:
      for consecutive N pixels of the image data, dividing original pixel values of the N pixels into two parts according to pixel value differences of each pair of adjacent pixels of the N pixels, to generate N first pixel values of the first image data and N second pixel values of the second image data.

10. The image processing method of claim 9, wherein the step of dividing the pixel value of each pixel of the image data into two parts to generate the first image data and the second image data comprises:
   when the N original pixel values of the N pixels are strict increasing sequence, calculating the pixel value differences of each pair of adjacent pixels of the N pixels to generate (N−1) pixel value differences, and selecting a minimum pixel value difference from the (N−1) pixel value differences to generate the N first pixel values, wherein each of pixel value differences of each pair of adjacent pixels of the N first pixel values is equal to the minimum pixel value difference.

11. The image processing method of claim 10, wherein the step of dividing the pixel value of each pixel of the image data into two parts to generate the first image data and the second image data comprises:
   subtracting the N first pixel values from the N original pixel values to generate the N second pixel values.

12. The image processing method of claim 9, wherein the step of enlarging the second image data in the non-linear manner to generate the enlarged second image data comprises:
    determining a first end value and a second end value of a transition zone according to the N second pixel values;
    calculating a center pixel value of the transition zone; and
    referring to the first end value, the second end value and the center pixel value of the transition zone to enlarge the N second pixel values in the non-linear manner to generate (N−1)*M+1 pixel values of the enlarged second image data, wherein M is an enlargement factor.

13. The image processing method of claim 12, wherein the (N−1)*M+1 pixel values comprises three segments, each of the pixel values of a first segment is equal to the first end value of the transition zone, the pixel values of a second segment are calculated by using interpolations according to the first end value and the second end value of the transition zone, and each of the pixel values of a third segment is equal to the second end value of the transition zone.

14. The image processing method of claim 13, wherein the pixel values of the second segment are calculated by using linear interpolations according to the first end value and the second end value of the transition zone.

15. The image processing method of claim 14, wherein the pixel values of the second segment comprise the center pixel value of the transition zone, and the center pixel value of the transition zone is an average of the first end value and the second end value of the transition zone.

16. The image processing method of claim 12, wherein the step of enlarging the first image data in the linear manner to generate the enlarged first image data comprises:
    performing a linear interpolation operation upon the N first pixel values to generate (N−1)*M+1 pixel values of the enlarged first image data; and
    directly adding the (N−1)*M+1 pixel values of the enlarged first image data and the (N−1)*M+1 pixel values of the enlarged second image data to generate the output image.

* * * * *

UNITED STATES PATENT AND TRADEMARK OFFICE
CERTIFICATE OF CORRECTION

PATENT NO.        : 11,010,869 B2
APPLICATION NO.   : 16/528585
DATED             : May 18, 2021
INVENTOR(S)       : Yu-Shiang Huang It is certified that error appears in the above-identified patent and that said Letters Patent is hereby corrected as shown below:

On the Title Page

Item (30), correct the application number of the TW priority application from "10713889.6" to --107138896--.

Signed and Sealed this
Twenty-ninth Day of June, 2021

Drew Hirshfeld
*Performing the Functions and Duties of the
Under Secretary of Commerce for Intellectual Property and
Director of the United States Patent and Trademark Office*